(12) United States Patent
Hwang et al.

(10) Patent No.: US 12,533,722 B2
(45) Date of Patent: Jan. 27, 2026

(54) PLATED STEEL SHEET FOR HOT PRESS FORMING

(71) Applicant: POSCO Co., Ltd, Pohang-si (KR)

(72) Inventors: Hyeon-seok Hwang, Gwangyang-si Jeollanam-do (KR); Kkochnim Oh, Buk-gu Gwangju (KR)

(73) Assignee: POSCO Co., Ltd, Pohang-si (KR)

( * ) Notice: Subject to any disclaimer, the term of this patent is extended or adjusted under 35 U.S.C. 154(b) by 0 days.

(21) Appl. No.: 18/268,138

(22) PCT Filed: Dec. 17, 2021

(86) PCT No.: PCT/KR2021/019275
§ 371 (c)(1),
(2) Date: Jun. 16, 2023

(87) PCT Pub. No.: WO2022/131848
PCT Pub. Date: Jun. 23, 2022

(65) Prior Publication Data
US 2024/0051005 A1 Feb. 15, 2024

(30) Foreign Application Priority Data
Dec. 18, 2020 (KR) .................. 10-2020-0178907

(51) Int. Cl.
*B21D 22/02* (2006.01)
*B32B 15/01* (2006.01)
(Continued)

(52) U.S. Cl.
CPC .......... *B21D 22/022* (2013.01); *B32B 15/011* (2013.01); *B32B 15/012* (2013.01);
(Continued)

(58) Field of Classification Search
CPC ... B21D 22/022; B32B 15/012; B32B 15/011; B32B 15/04; B32B 15/043; B32B 15/18;
(Continued)

(56) References Cited

U.S. PATENT DOCUMENTS 5,308,710 A * 5/1994 Takeda .................. C23C 28/025
428/653
2019/0218651 A1 7/2019 Allely et al.
(Continued)

FOREIGN PATENT DOCUMENTS

CN 110114500 A 8/2019
EP 3733922 A1 11/2020
(Continued)

OTHER PUBLICATIONS

International Search Report dated Apr. 13, 2022 issued in International Patent Application No. PCT/KR2021/019275 (with English translation).
(Continued)

*Primary Examiner* — Michael E. La Villa
(74) *Attorney, Agent, or Firm* — MORGAN, LEWIS & BOCKIUS LLP

(57) ABSTRACT

A plated steel sheet for hot press forming with improved hydrogen delayed fracture properties is disclosed. The disclosed plated steel sheet includes a base steel sheet, and a plating layer formed on a surface of the base steel sheet and including, by weight, Si: 5.0 to 15.0%, Zn: 10.0 to 30.0%, Fe: 4.0 to 12.0%, and the remainder including Al and unavoidable impurities.

5 Claims, 1 Drawing Sheet

(51) Int. Cl.

| | |
|---|---|
| *B32B 15/04* | (2006.01) |
| *B32B 15/18* | (2006.01) |
| *B32B 15/20* | (2006.01) |
| *C21D 1/18* | (2006.01) |
| *C21D 1/673* | (2006.01) |
| *C21D 7/13* | (2006.01) |
| *C21D 8/00* | (2006.01) |
| *C21D 8/02* | (2006.01) |
| *C21D 9/46* | (2006.01) |
| *C22C 21/00* | (2006.01) |
| *C22C 21/02* | (2006.01) |
| *C22C 21/04* | (2006.01) |
| *C22C 21/10* | (2006.01) |
| *C22C 38/00* | (2006.01) |
| *C22C 38/02* | (2006.01) |
| *C22C 38/04* | (2006.01) |
| *C22C 38/14* | (2006.01) |
| *C23C 2/06* | (2006.01) |
| *C23C 2/12* | (2006.01) |
| *C23C 2/26* | (2006.01) |
| *C23C 2/28* | (2006.01) |
| *C23C 2/40* | (2006.01) |
| *C23C 28/02* | (2006.01) |
| *C23C 30/00* | (2006.01) |

(52) U.S. Cl.
CPC ............ *B32B 15/04* (2013.01); *B32B 15/043* (2013.01); *B32B 15/18* (2013.01); *B32B 15/20* (2013.01); *C21D 1/18* (2013.01); *C21D 1/673* (2013.01); *C21D 7/13* (2013.01); *C21D 8/005* (2013.01); *C21D 8/0205* (2013.01); *C21D 8/0226* (2013.01); *C21D 8/0278* (2013.01); *C21D 9/46* (2013.01); *C22C 21/00* (2013.01); *C22C 21/02* (2013.01); *C22C 21/04* (2013.01); *C22C 21/10* (2013.01); *C22C 38/002* (2013.01); *C22C 38/004* (2013.01); *C22C 38/02* (2013.01); *C22C 38/04* (2013.01); *C22C 38/14* (2013.01); *C23C 2/06* (2013.01); *C23C 2/12* (2013.01); *C23C 2/26* (2013.01); *C23C 2/28* (2013.01); *C23C 2/29* (2022.08); *C23C 2/40* (2013.01); *C23C 28/02* (2013.01); *C23C 28/023* (2013.01); *C23C 30/00* (2013.01); *C23C 30/005* (2013.01); *Y10T 428/12757* (2015.01); *Y10T 428/12764* (2015.01); *Y10T 428/12958* (2015.01); *Y10T 428/12972* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01); *Y10T 428/27* (2015.01)

(58) Field of Classification Search
CPC .......... B32B 15/20; C21D 1/18; C21D 1/673; C21D 7/13; C21D 8/005; C21D 8/0205; C21D 8/0226; C21D 8/0278; C21D 9/46; C22C 21/02; C22C 21/10; C22C 21/04; C22C 21/00; C22C 38/002; C22C 38/004; C22C 38/02; C22C 38/04; C22C 38/14; C23C 2/06; C23C 2/12; C23C 2/26; C23C 2/28; C23C 2/29; C23C 2/40; C23C 28/02; C23C 28/023; C23C 30/00; C23C 30/005; Y10T 428/12757; Y10T 428/12764; Y10T 428/12958; Y10T 428/12972; Y10T 428/2495; Y10T 428/24967; Y10T 428/27; Y10T 428/26; Y10T 428/263; Y10T 428/264; Y10T 428/265

See application file for complete search history.

(56) References Cited

U.S. PATENT DOCUMENTS

| | | | |
|---|---|---|---|
| 2020/0087747 A1 | 3/2020 | Kim et al. | |
| 2022/0025498 A1* | 1/2022 | Suzuki | .................. C23C 28/321 |
| 2022/0372608 A1* | 11/2022 | Hwang | .................. C22C 38/14 |

FOREIGN PATENT DOCUMENTS

| | | | |
|---|---|---|---|
| EP | 4079922 A2 * | 10/2022 | |
| JP | H08-283925 A | 10/1996 | |
| JP | 2003-181549 A | 7/2003 | |
| JP | 2010-070784 A | 4/2010 | |
| JP | 2018-528325 A | 9/2018 | |
| KR | 10-2017-0060167 A | 5/2017 | |
| KR | 10-1858868 B1 | 5/2018 | |
| KR | 10-2019-0078438 A | 7/2019 | |
| KR | 10-2021-0078277 A | 6/2021 | |
| WO | WO 2019/132461 A1 * | 7/2019 | |
| WO | 2020/111230 A1 | 6/2020 | |
| WO | WO 2021/125696 * | 6/2021 | |

OTHER PUBLICATIONS

Partial Supplemental European Search Report dated Jun. 4, 2024 issued in European Patent Application No. 21907152.9.
Japanese Office Action dated Jun. 11, 2024 issued in Japanese Patent Application No. 2023-537428 (with English translation).
Extended European Search Report dated Oct. 23, 2024, issued in corresponding European Patent Application No. 21907152.9.
Office Action dated Mar. 7, 2025 issued in corresponding Japanese Patent Application No. 2023-537428 with English translation. (Note: EP 03733922 A1, WO 2012/111230 A1, JP 2003-181549 A, and JP H08-283925 A already submitted.).
Office Action dated May 22, 2025 issued in corresponding Korean Patent Application No. 1-2023-04469 with English translation.
Office Action issued in corresponding Chinese Patent Application No. 202180091161.4 dated May 30, 2025, with English translation.

* cited by examiner

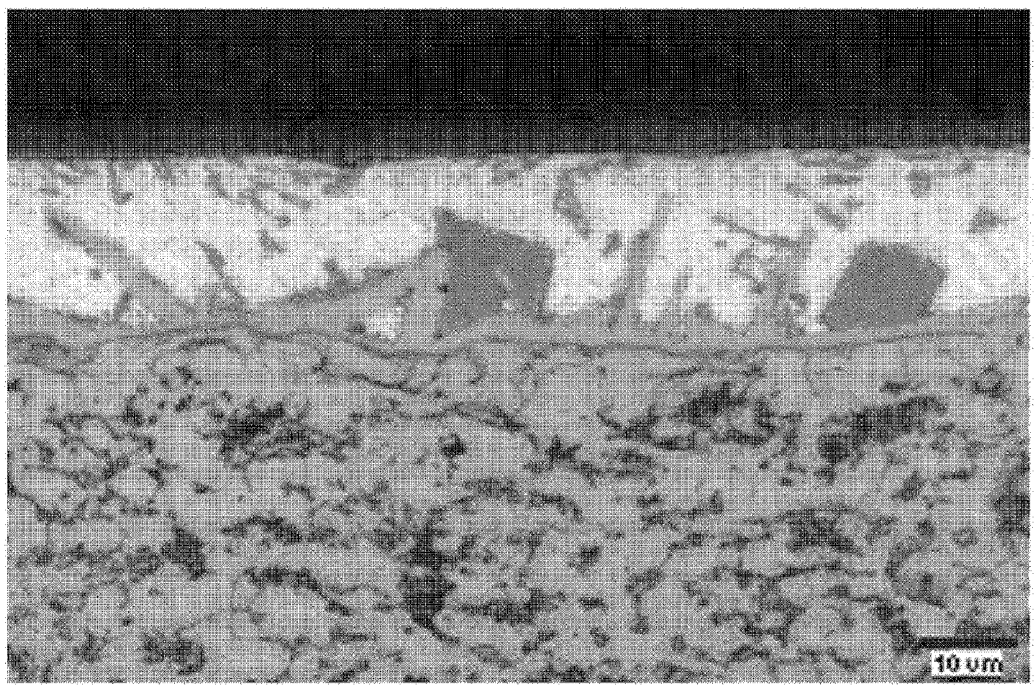

PLATED STEEL SHEET FOR HOT PRESS FORMING

CROSS-REFERENCE OF RELATED APPLICATIONS

This application is the U.S. National Phase under 35 U.S.C. § 371 of International Patent Application No. PCT/KR2021/019275, filed on Dec. 17, 2021 which claims priority to and the benefit of Korean Application Nos. 10-2020-0178907 filed on Dec. 18, 2020, the entire contents of which are incorporated herein by reference.

TECHNICAL FIELD

The present invention relates to a plated steel sheet for hot press forming and a method of manufacturing the same, and more particularly, to a plated steel sheet for hot press forming with improved hydrogen delayed fracture properties by optimizing component conditions and heat treatment conditions, and a method of manufacturing the same.

BACKGROUND ART

Recently, as the demand for safety and fuel efficiency has increased, the use of high strength steel for weight reduction of automobiles is increasing, but the high strength steel has a problem in that it is difficult to form a product having a complex and precise shape as material fracture occurs during processing or spring back occurs after processing.

Hot press forming (HPF) is a method for solving these problems, and its application is recently expanding. A hot pressed steel sheet is easy to form as it is hot-worked in a state where it is usually heated to 800 to 950° C., and has the advantage of increasing the strength of molded articles when quenching through a mold.

However, when a steel material is heated to a high temperature, the surface of the steel material is oxidized, so there is a problem in that a process of removing the product on the surface of the steel sheet must be added after press forming. For this purpose, conventionally, a method of introducing an aluminum plating layer or zinc plating on the surface of the steel sheet as a material for hot press forming has been proposed.

However, the use of a steel sheet plated with high strength steel is limited due to delayed fracture caused by hydrogen. Specifically, delayed fracture is a phenomenon in which hydrogen diffuses into steel to reduce the ductility and toughness of a steel material after molding of a part, and fracture occurs without plastic deformation.

In particular, in an aluminum-plated steel sheet using high strength steel as a base, a hydrogen diffusion coefficient of an Al and Al—Fe-based interface alloy layer is very low, and a problem of delayed fracture is more serious than that of a steel sheet without a metal coating.

Therefore, it is required to develop a plated steel sheet for hot press forming that can be applied to automobile parts by securing not only strength but also improved hydrogen delayed fracture properties.

DISCLOSURE

Technical Problem

Embodiments of the present invention are intended to provide a plated steel sheet for hot press forming with improved hydrogen delayed fracture properties and a method of manufacturing the same.

Technical Solution

A plated steel sheet for hot press forming according to an embodiment of the present invention includes a base steel sheet, and a plating layer formed on a surface of the base steel sheet and including, by weight, Si: 5.0 to 15.0%, Zn: 10.0 to 30.0%, Fe: 4.0 to 12.0%, and the remainder including Al and unavoidable impurities.

In addition, according to one embodiment of the present invention, the base steel sheet may contain, by weight, C: 0.1 to 0.4%, Mn: 0.5 to 3.0%, Si: 0.1 to 0.8%, B: 0.01% or less (excluding 0), Ti: 0.1% or less (excluding 0), and the remainder including Fe and other unavoidable impurities.

Further, according to one embodiment of the present invention, the plating layer attached to the surface of the base steel sheet may have an attachment amount of 40 to 120 g/m$^2$.

In addition, according to one embodiment of the present invention, the thickness of the plating layer may be 5 to 40 μm.

In addition, according to one embodiment of the present invention, an Al—Fe-based interface alloy layer formed between the base steel sheet and the plating layer and including, by weight, Al: 30.0 to 60.0% and Si: 5.0 to 20.0%, may be provided.

In addition, according to one embodiment of the present invention, the plating layer may contain silicon crystals having a silicon concentration of 60% or more, a zinc concentration of less than 20%, and a long axis length of 1 μm or more.

A method of manufacturing a plated steel sheet for hot press forming according to another embodiment of the present invention includes: providing a base steel sheet and preparing a plated steel sheet by immersing the base steel sheet in a plating solution including, by weight, Si: 5.0 to 15.0%, Zn: 10.0 to 30.0%, and the remainder including Al and unavoidable impurities; heating the plated steel sheet to a temperature greater than 800° C. and less than 1,100° C.; hot press forming the plated steel sheet; and cooling the hot press-formed plated steel sheet.

In addition, according to one embodiment of the present invention, the heating of the plated steel sheet may be performed for more than 2 minutes and less than 15 minutes.

Further, according to one embodiment of the present invention, the heating of the plated steel sheet may be performed at a rate of 2° C./sec to 15° C./sec.

Further, according to one embodiment of the present invention, in the cooling of the plated steel sheet formed by hot pressing, the sheet may be cooled at a rate of 15° C./sec or more in a temperature range of 700° C. to 350° C.

Advantageous Effects

According to one embodiment of the present invention, since it is possible to provide a plated steel sheet for hot press forming with improved hydrogen delayed fracture properties and a method of manufacturing the same, it is possible to apply the same to automobile parts.

DESCRIPTION OF DRAWINGS

FIG. 1 shows a photograph of a cross-section of the plating layer of Example 1 observed using a scanning electron microscope.

MODES OF THE INVENTION

A plated steel sheet for hot press forming according to an embodiment of the present invention includes a base steel sheet, and a plating layer formed on a surface of the base steel sheet and including, by weight, Si: 5.0 to 15.0%, Zn: 10.0 to 30.0%, Fe: 4.0 to 12.0%, and the remainder including Al and unavoidable impurities.

Hereinafter, embodiments of the present invention will be described in detail with reference to the accompanying drawings. The following embodiments are presented to sufficiently convey the spirit of the present invention to a person having ordinary knowledge in the technical field to which the present invention belongs. The present invention may be embodied in other forms without being limited to only the embodiments presented herein. In the drawings, in order to clarify the present invention, the illustration of parts irrelevant to the description may be omitted, and the size of components may be slightly exaggerated to aid understanding.

Throughout the specification, when a part is said to "include" a component, this means that the part may further include other components rather than excluding other components unless specifically stated to the contrary. Singular expressions include plural expressions unless the context clearly dictates otherwise.

Hot press forming (HPF) is a method of processing a steel sheet into complex shapes at a high temperature by utilizing the property of softening as the temperature of the steel sheet increases, more specifically, a method in which after heating the steel sheet to an austenite region or higher, that is, in a state in which a phase transition is possible, rapid cooling is performed simultaneously with processing to transform the structure of the steel sheet into martensite, thereby manufacturing a product having high strength and a precise shape.

When high strength steel is heated to a high temperature, surface defects such as corrosion or decarburization may occur on a steel surface, for the purpose of preventing this, zinc- or aluminum-based plating is applied to the surface, and then hot press forming is performed. At this time, since zinc (Zn) or aluminum (Al) used as the plating layer serves to protect the steel sheet from an external environment, corrosion resistance of the steel sheet can be improved.

Compared to a galvanized steel sheet, the aluminum-plated steel sheet has the advantage of not forming a thick oxide film on the plating layer even at a high temperature due to the high melting point of Al and a dense and thin Al oxide film formed on top of the plating layer.

However, when an aluminum-plated steel sheet is formed by hot pressing, delayed fracture easily occurs as moisture in air is adsorbed on a surface of the steel sheet and dissociated into hydrogen in the heating step. In a steel sheet in which a metal coating is not applied to a surface of the base material, hydrogen can diffuse into air from the surface of the base material, but it is difficult for hydrogen to escape from a base material to the outside of the aluminum-plated steel sheet, so delayed fracture is likely to occur.

Therefore, the inventors of the present invention confirmed that hydrogen adsorption can be suppressed during a manufacturing process to improve the hydrogen delayed fracture properties of the aluminum-plated steel sheet while introducing a plating layer structure in which hydrogen adsorbed on a base metal can easily escape to the outside during the plating process, and came up with the present invention.

Hereinafter, an embodiment of the present invention will be described in detail with reference to the accompanying drawings.

A plated steel sheet for hot press forming according to an embodiment of the present invention includes a base steel sheet and an aluminum-based plating layer formed on a surface of the base steel sheet.

The base steel sheet of the present invention is a base steel sheet used in the manufacture of a plated steel sheet for hot press forming, and can be applied as long as it is a steel type that undergoes martensitic transformation during hot press forming. For example, the base steel sheet contains, by weight, C: 0.1 to 0.4%, Mn: 0.5 to 3.0%, Si: 0.1 to 0.8%, B: 0.01% or less (excluding 0), Ti: 0.10% or less (excluding 0), and the remainder including Fe and other unavoidable impurities.

Hereinafter, the reason for limiting the numerical value of an alloy component content will be described. Hereinafter, unless otherwise specified, units are % by weight.

The content of C is 0.1 to 0.4%.

Carbon (C) is an austenite phase stabilizing element, and may be added in an amount of 0.1% or more to improve hydrogen delayed fracture properties. However, in consideration of the problem of poor weldability due to an increase in electrical resistivity when the content is excessive, the upper limit may be limited to 0.4%.

The content of Mn is 0.5 to 3.0%.

Manganese (Mn) is an element that stabilizes an austenite structure together with carbon, and may be added in an amount of 0.5% or more to suppress the formation of an α'-martensite structure during processing. However, in consideration of the increase in costs as well as the fact that the effect of strength improvement is saturated when the content is excessive, the upper limit may be limited to 3.0%.

The content of Si is 0.1 to 0.8%.

Silicon (Si) is an element used as a deoxidizer, and may be added in an amount of 0.1% or more to improve the yield strength and tensile strength of steel by solid solution strengthening. However, when the content is excessive, a large amount of silicon oxide is formed on a surface during hot rolling, resulting in poor pickling properties and increased electrical resistivity, and since there is a problem of poor weldability, the upper limit may be limited to 0.8%.

The content of B is 0.01% or less (excluding 0).

Boron (B) is an element effective for delaying the transformation from austenite to ferrite. However, when the content is excessive, there is a problem of deteriorating hot processability, and in the present invention, the boron content is limited to 0.01% or less.

The content of Ti is 0.1% or less (excluding 0).

Titanium (Ti) is an element that improves the formability of steel by forming nitride by reacting with nitrogen in steel and improves the strength of steel by forming carbide by reacting with carbon in steel. However, when the content is excessive, since the precipitate is excessively formed and there is a problem of deteriorating fatigue properties of the steel, in the present invention, the titanium content is limited to 0.1% or less.

The remaining component of the present invention is iron (Fe). However, since unintended impurities from raw materials or the surrounding environment may inevitably be incorporated in an ordinary manufacturing process, this cannot be excluded. Since these impurities are known to anyone skilled in the ordinary manufacturing process, all of them are not specifically mentioned in this specification.

Next, in order to apply the base steel sheet as a steel sheet for hot press forming, it is preferable to introduce a plating layer on the base steel sheet. The plating layer may be an ordinary aluminum-based plating layer, and more specifically, may be a molten aluminum plating layer or a molten aluminum alloy plating layer.

The pure Al and Al—Fe-based interface alloy layer present in the aluminum plating layer has a low diffusion coefficient of hydrogen and is prone to delayed fracture.

In the present invention, Si is introduced into the aluminum plating layer to suppress the formation of an Al—Fe alloy phase, and Zn is dissolved in the aluminum plating layer to facilitate the diffusion of hydrogen in the plating layer into the external atmospheric environment.

The aluminum-based plating layer of the present invention contains, by weight, Si: 5.0 to 15.0%, Zn: 10.0 to 30.0%, Fe: 4.0 to 12.0%, and the remainder including Al and unavoidable impurities.

Hereinafter, the reason for limiting the numerical value of an alloy component content of the plating layer formed on the surface of the base steel sheet in the embodiment of the present invention and contributing to an improvement in corrosion resistance and hydrogen delayed fracture properties of the steel sheet will be described.

The content of Si is 5.0 to 15.0%.

Silicon (Si) is an element added to control the alloying of Al included in the plating layer and Fe included in the base steel sheet. When the Si content is low, an excessive reaction between Fe in base iron and Al in a plating bath occurs to form an Al—Fe phase having high brittleness, and a plating layer including a phase having excessively high brittleness easily peels off during blank processing or handling of the plated steel sheet. In addition, when Si is added to pure Al, the melting point of the plating bath may be lowered to lower the temperature of the plating bath. Accordingly, 5.0% or more of zinc may be added in order to effectively suppress defects such as ash generation of added zinc. However, when the Si content exceeds an eutectic composition, the plating bath temperature is rapidly increased. There is no choice but to maintain a high plating bath temperature, which causes deterioration of structures such as a sink roll in the plating bath due to high temperatures during operation and deteriorates workability, so the upper limit may be limited to 15.0%.

The content of Zn is 10.0 to 30.0%.

Zinc (Zn) is an element that has a sacrificial anticorrosive effect, improves the basic corrosion resistance of the plating layer, and promotes the diffusion of hydrogen in the plating layer rather than the aluminum plating layer. In addition, zinc forms zinc oxide on a surface during hot forming, and this oxide has a porous form with empty spaces compared to dense aluminum oxide. In the case of a steel sheet including only aluminum, when the zinc oxide is formed on the surface in a structure with only aluminum oxide, which is dense and hard on the surface, it forms a structure in which hydrogen can diffuse to the outside of the plating layer and plays a role in helping to release hydrogen in the plating layer. To this end, 15.0% or more, preferably 18% or more, and more preferably 22% or more of zinc may be contained in the plating layer. However, when the content is excessive, there is a problem of liquid metal embrittlement (LME) caused by zinc during welding, so the upper limit may be limited to 35.0%, preferably 30%, more preferably 27% in the plating layer.

The content of Fe is 4.0 to 120.0%.

Iron (Fe) is an element forming an Al—Fe-based interface alloy layer, and Al of the plating layer and Fe of the base iron diffuse to form an Al—Fe-based alloy phase uniformly on a surface of the base metal and to be present in the plating layer. In the absence of such an alloy layer, the interface layer becomes thick due to continuous diffusion of Fe, which may increase the brittleness of the plating layer, so that it is preferably included in an amount of 4% or more. However, when a Fe content in the plating layer is excessive, since there is a problem in that alloy phases other than $FeAl_2$, $FeAl_3$ and $Fe_2Al_5$ are formed among Fe—Al intermetallic compounds, the upper limit may be limited to 12.0%.

A thickness of the plating layer is preferably 5 to 40 μm, and when an average thickness of the plating layer is less than 5 μm, it is not possible to sufficiently secure the corrosion resistance of the plated steel sheet, and when it exceeds 40 μm, it is advantageous in terms of securing corrosion resistance, but there is a problem in that the manufacturing cost of the steel sheet increases in addition to an excessive increase in a plating amount.

The plated steel sheet for hot press forming of the present invention may, in some cases, further include an Al—Fe-based interface alloy layer formed at the interface between the base steel sheet and the aluminum-based plating layer, and in this case, the Al—Fe-based interface alloy layer includes, by weight, Al: 30.0 to 60.0% and Si: 5.0 to 20.0%. Fe and Mn contained in the alloy layer may originate from components of a plating bath during hot-dip plating or may be diffused from the base steel sheet.

In addition, the plating layer may contain silicon crystals having a silicon concentration of 60% or more, a zinc concentration of less than 20%, and a long axis length of 1 μm or more.

The silicon crystal may appear in the shape of a polygon in the plating layer, and the long axis of the polygon means the longest distance between vertices in the polygon.

In addition, an upper limit of the length of the long axis of the plating layer is preferably ⅘ or less of the thickness of the plating layer. This is because when the length of the silicon crystal is similar to the thickness of the plating layer, surface defects or peeling of the plating layer may be caused.

Next, a method of manufacturing a plated steel sheet for hot press forming according to another aspect of the present invention will be described.

A method of manufacturing a plated steel sheet for hot press forming according to one embodiment of the present invention includes: providing a base steel sheet and preparing a plated steel sheet by immersing the base steel sheet in a plating solution including, by weight, Si: 5.0 to 15.0%, Zn: 10.0 to 30.0%, and the remainder including Al and unavoidable impurities; heating the plated steel sheet to a temperature greater than 800° C. and less than 1,100° C.; hot press forming the plated steel sheet; and cooling the hot press-formed plated steel sheet.

The reason for the numerical limitation of an alloying element content is as described above.

A plating layer is formed on at least one surface of the base steel sheet by immersing the prepared base steel sheet in an aluminum-silicon or zinc alloy plating bath.

Thereafter, the base steel sheet immersed in the plating bath is taken out of a galvanizing bath via a sink roll. At this time, an attachment amount of the plating layer on the surface of the base steel sheet can be adjusted by controlling the flow amount and flow rate of gas sprayed from an air knife. At this time, the attachment amount of the plating layer adhered to the surface of the base steel sheet can be controlled to 40 to 120 g/m².

In addition, the manufacturing of the plated steel sheet may include a process of cooling from 600° C. to 450° C. at a cooling rate of 10 to 35° C./s in order to grow silicon crystals. It is difficult to sufficiently induce super-cooling of the plating layer only with gas sprayed from the air knife. Therefore, through the cooling process, super-cooling of the plating layer may be induced, and growth of initially precipitated silicon crystals may be achieved.

Hereinafter, heat treatment conditions during heating, hot press forming, and cooling in the method for manufacturing a plated steel sheet for hot press forming will be described in detail.

During the hot press forming process, heating conditions are a major factor in diffusing hydrogen from the steel sheet to the outside. In the present invention, as a method for reducing hydrogen delayed fracture, an attempt was made to release hydrogen adsorbed in the steel sheet to the outside by optimizing the heating conditions during the hot press forming process.

When a temperature range during heat treatment is excessively low, strength cannot be secured due to insufficient austenite transformation, and since there is a problem that diffusion of hydrogen to the outside does not sufficiently proceed, in the present invention, the heating temperature is controlled to exceed 800° C. In contrast, when the temperature range during heat treatment is excessively high, since there is a problem that the hydrogen solubility of the steel sheet is increased, the heating temperature is controlled to be less than 1,100° C. The heating temperature can be controlled to preferably 850 to 1,000° C., more preferably 870 to 970° C.

Meanwhile, when the heating time is long, there is a problem in that a crystal size continuously grows and becomes vulnerable to hydrogen delayed fracture. In addition, as moisture is adsorbed on the surface to form an oxide, oxygen remains in the form of an oxide, but dissociated hydrogen remains in the steel sheet, easily causing delayed fracture. Considering the foregoing, the present inventors tried to control the heating time to more than 2 minutes and less than 15 minutes. The heating time can be controlled preferably from 2 minutes to 12 minutes, more preferably from 3 minutes to 10 minutes.

Meanwhile, in a hot press process, it is necessary to reduce the heating time of the material to improve productivity. For this purpose, ohmic heating or high-frequency induction heating is used.

However, all of the rapid heating methods introduce the principle that temperature rises due to the resistance of the steel sheet as current flows through the steel sheet, and a magnetic field is generated again by the current flowing through the steel sheet, thereby moving the molten metal on the surface of the base material.

Even in the case of rapid heating using IR instead of electric current, considering the principle of IR heating from the surface, the surface of the plating layer is first melted and the plating layer flows down, resulting in uneven surface.

In the present invention, as a method for reducing hydrogen delayed fracture, when heating a plated steel sheet, the temperature increase condition is optimized to a rate of 2° C./sec to 15° C./sec to release hydrogen in the steel sheet to the outside.

Finally, hot press forming is performed and a cooling process is performed.

At this time, cooling may be performed at a rate of 15° C./sec or more in a temperature range of 350° C. to 700° C. to secure a martensitic structure of 60% or more in the plated steel sheet.

As described above, when the alloy components of the plating layer and the heating conditions during hot press forming are controlled, the hydrogen delayed fracture properties of the aluminum-plated steel sheet can be improved.

Hereinafter, the present invention will be described in more detail through examples.

Cold-rolled steel sheets including, by weight, C: 0.2%, Mn: 2.0%, Si: 0.5%, B: 0.005%, and Ti: 0.05% were put into a plating bath having compositions shown in Table 1 below, respectively, and a plating bath temperature was maintained at 40° C. higher than a melting point, and plating was performed. A plating amount was adjusted by continuously removing the excess plating layer from a specimen immersed in the plating bath using an air knife.

The plating amount and components of the plating layer were measured by removing surface oxides of the plating layer with a NaOH solution and dissolving the plating layer with hydrochloric acid, and then performing through inductively coupled plasma spectrometer (ICP) analysis and are listed in Table 1.

Meanwhile, Si crystals included in the plating layer were analyzed by energy dispersive X-ray spectroscopy (EDS) at a magnification of 3000 using a scanning electron microscope (SEM).

Next, a plated specimen was processed into a 200 mm*120 mm specimen for hot press forming, charged into a box heating furnace set at an ambient temperature of 900° C., and heated for 5 minutes. At this time, the atmosphere of the box heating furnace was an air atmosphere, and the temperature of the atmosphere was maintained uniformly by measuring a thermocouple and adjusting a power amount. A heated specimen was quenched using a mold through which cooling water flowed to complete martensitic transformation.

Then, delayed fracture properties were evaluated. Specifically, a quenched specimen was processed into a length of 180 mm and a width of 30 mm, bending was performed so that a displacement of about 80% of yield strength was applied, and after immersion in a 0.2 N hydrochloric acid solution for 120 hours, the presence or absence of cracks in the specimen was visually observed and listed in Table 1 below. In Table 1, the case where cracks occurred was indicated as 'O', and the case where cracks did not occur was indicated as 'X'.

When cracks occur, delayed fracture occurs because cracks occur under conditions within the yield strength.

TABLE 1

| | Plating layer component (% by mass) | | | | One side attachment | Heating | Heating | Whether cracks |
| --- | --- | --- | --- | --- | --- | --- | --- | --- |
| | Al | Si | Zn | Fe | amount | temperature | time | occur |
| Inventive Steel 1 of | 61.2 | 8.8 | 24.8 | 5.2 | 65.0 | 900° C. | 5 minutes | X |
| Inventive Steel 2 | 69.9 | 5.3 | 20.6 | 3.8 | 70.0 | 900° C. | 5 minutes | X |
| Inventive Steel 3 | 62.4 | 10.2 | 17.5 | 9.6 | 50.0 | 900° C. | 5 minutes | X |

TABLE 1-continued

| | Plating layer component (% by mass) | | | | One side attachment amount | Heating temperature | Heating time | Whether cracks occur |
|---|---|---|---|---|---|---|---|---|
| | Al | Si | Zn | Fe | | | | |
| Inventive Steel 4 | 55.0 | 12.0 | 27.0 | 6.0 | 105.0 | 900° C. | 5 minutes | X |
| Comparative steel 1 | 84.3 | 7.0 | 0.0 | 8.6 | 60.0 | 900° C. | 5 minutes | O |
| Comparative steel 2 | 64.4 | 2.2 | 21.8 | 11.5 | 35.0 | 900° C. | 5 minutes | O |
| Comparative steel 3 | 50.3 | 4.7 | 39.5 | 5.5 | 55.0 | 900° C. | 5 minutes | O |
| Comparative steel 4 | 0.4 | 0.0 | 99.4 | 0.2 | 60.0 | 900° C. | 5 minutes | O |

Referring to Table 1, delayed fracture properties were derived differently as the composition of the plating layer was changed under the same heat treatment conditions. FIG. 1 shows a photograph of a cross-section of the plating layer of Example 1 observed using a scanning electron microscope. Specifically, referring to Table 1 and FIG. 1, in the case of Inventive steels 1 to 4 in which a composition of the plating layer satisfies an alloy composition suggested by the present invention and no cracks occur, the plating layer was present in the form in which zinc was dissolved in aluminum, and silicon formed some crystals to precipitate in a long axis of 1 μm or more in the plating layer.

This is because various grain boundaries can be secured between a surface and a base metal due to the presence of various crystals in the plating layer, and it was judged that these grain boundaries improved a delayed fracture property by hydrogen by providing a passage through which hydrogen could diffuse during a heating process. In addition, aluminum in which zinc is dissolved distorts an aluminum crystal lattice, helping hydrogen with a small atomic size to move between the lattices, and the hydrogen diffuses to the surface and is released.

Comparative steel 1 is a case in which Zn is not included, and Zn cannot be dissolved in an aluminum plating layer, and Comparative steels 2 to 4 are cases in which a Si content is less than 5.0%, and since the formation of an Al—Fe alloy phase could not be suppressed, cracks occurred during a delayed fracture test.

Next, plating was performed on a 22MnB5 cold-rolled steel sheet to have a composition shown in Table 2 below, and during a hot press forming process, heating was performed under conditions shown in Table 2 below to evaluate surface material and delayed fracture properties.

In Table 2 below, after an ordinary hot press process, the case where tensile strength was less than 85% was determined to be fail, and pass was marked as O and fail was marked as X.

TABLE 2

| | Plating layer component (% by mass) | | | | One side attachment amount | Heating temperature | Heating time | Whether cracks occur | Material evaluation (TS) |
|---|---|---|---|---|---|---|---|---|---|
| | Al | Si | Zn | Fe | | | | | |
| Comparative Example 1 | 84.3 | 7.0 | 0.0 | 8.6 | 60.0 | 800° C. | 2 minutes | X | X |
| Comparative Example 2 | 84.3 | 7.0 | 0.0 | 8.6 | 60.0 | 800° C. | 5 minutes | O | X |
| Comparative Example 3 | 84.3 | 7.0 | 0.0 | 8.6 | 60.0 | 800° C. | 15 minutes | O | O |
| Comparative Example 4 | 84.3 | 7.0 | 0.0 | 8.6 | 60.0 | 900° C. | 2 minutes | X | X |
| Comparative Example 5 | 84.3 | 7.0 | 0.0 | 8.6 | 60.0 | 900° C. | 5 minutes | O | O |
| Comparative Example 6 | 84.3 | 7.0 | 0.0 | 8.6 | 60.0 | 900° C. | 15 minutes | O | O |
| Comparative Example 7 | 61.2 | 8.8 | 24.8 | 5.2 | 65.0 | 800° C. | 2 minutes | X | X |
| Comparative Example 8 | 61.2 | 8.8 | 24.8 | 5.2 | 65.0 | 800° C. | 5 minutes | X | X |
| Comparative Example 9 | 61.2 | 8.8 | 24.8 | 5.2 | 65.0 | 800° C. | 15 minutes | O | O |
| Comparative Example 10 | 61.2 | 8.8 | 24.8 | 5.2 | 65.0 | 900° C. | 2 minutes | X | X |
| Example 1 | 61.2 | 8.8 | 24.8 | 5.2 | 65.0 | 900° C. | 5 minutes | X | O |
| Comparative Example 11 | 61.2 | 8.8 | 24.8 | 5.2 | 65.0 | 900° C. | 15 minutes | O | O |

For the plating layer used in an experiment to confirm the process conditions, a plated steel sheet mainly composed of aluminum and silicon and a plated steel sheet including aluminum, zinc, and silicon were used. The heating temperature refers to an ambient temperature of a furnace, and the heating time refers to the elapsed time after a specimen is placed in the furnace at a predetermined heating temperature for a plated steel sheet at room temperature. Referring to Table 2, in the two types of plated steel sheets, in common, when a heating furnace atmosphere temperature is low and the heating time is short, delayed fracture resistance was favorably derived. This is because the material did not secure sufficient tensile strength because the material fell short of a target value rather than the effect of hydrogen in steel.

In the case of an embodiment in which silicon and zinc are introduced into the plating layer and heating conditions are satisfied during a hot press forming process, hydrogen in a steel sheet could be released to the outside to secure not only strength but also delayed fracture properties.

In contrast, in Comparative Examples 7 to 9, the heating temperature was less than 850° C., and in Comparative Example 10, the heating time was 2 minutes, and due to insufficient heating, delayed fracture did not occur due to low tensile strength during quenching.

Meanwhile, in Comparative Example 11 in which the heating time was long, a crystal size continued to grow and delayed fracture occurred.

Next, plating was performed on a 22MnB5 cold-rolled steel sheet in the same manner so as to have a composition shown in Table 3, and as heating under hot press forming conditions, a thermocouple was attached to a 200*100 mm test piece and heated using an IR heater. At this time, by receiving the temperature of the thermocouple and adjusting the power of the IR heater, a temperature increase rate was adjusted under conditions of Table 3 below.

Specifically, when the temperature of a steel sheet obtained through the thermocouple was measured and the temperature of the steel sheet reached 900° C., the elevated temperature was stopped and maintained at 900° C., and the heating time was measured based on the time when the temperature increase of the specimen was started. In Table 3 below, an average temperature increase rate of the steel sheet is shown based on the time taken to reach 900° C.

Next, quenching was performed by pressing between water-cooled molds for molding, and surface materials, plating surface quality, and delayed fracture properties were evaluated.

during a delayed fracture test, but the austenite transformation temperature of the steel sheet could not be reached even after heating for 5 minutes, and thus the tensile strength of material could not be secured.

In addition, in the case of Comparative Example 13 in which the temperature increase rate was 15° C./s, since a phenomenon in which a molten plating layer flows down from the surface occurred, a surface level difference and color non-uniformity of the plating layer occurred.

According to disclosed embodiments, the hydrogen delayed fracture properties of the aluminum-plated steel sheet can be improved by optimizing plating layer alloy components and heating conditions during hot press forming.

In the foregoing, although exemplary embodiments of the present invention have been described, the present invention is not limited thereto, and those skilled in the art will be able to understand that various changes and modifications are possible without departing from the concept and scope of the claims described below.

INDUSTRIAL APPLICABILITY

According to one embodiment of the present invention, it is possible to provide a plated steel sheet for hot press forming with improved hydrogen delayed fracture properties and a method of manufacturing the same.

The invention claimed is:

1. A plated steel sheet for hot press forming, comprising:
   a base steel sheet; and
   a plating layer formed on a surface of the base steel sheet and including, by weight, Si: 5.0 to 15.0%, Zn: 10.0 to 30.0%, Fe: 4.0 to 12.0%, and the remainder including Al and unavoidable impurities,
   wherein the plating layer includes silicon crystals having a silicon concentration of 60 wt % or more, a zinc concentration of less than 20 wt % with respect to 100 wt % of the silicon crystals, and a long axis length of 1 μm or more.

2. The plated steel sheet for hot press forming of claim 1, wherein the base steel sheet contains, by weight, C: 0.1 to

TABLE 3

| | Plating layer component (% by mass) | | | | Average temperature increase rate | Heating time | Whether cracks occur | Plating surface quality | Material evaluation |
| --- | --- | --- | --- | --- | --- | --- | --- | --- | --- |
| | Al | Si | Zn | Fe | (° C./s) | | | | (TS) |
| Comparative Example 12 | 61.2 | 8.8 | 24.8 | 5.2 | 2.0 | 5 minutes | X | O | X |
| Comparative Example 13 | 61.2 | 8.8 | 24.8 | 5.2 | 15.0 | 5 minutes | X | X | O |
| Example 2 | 61.2 | 8.8 | 24.8 | 5.2 | 3.0 | 5 minutes | X | O | O |
| Example 3 | 61.2 | 8.8 | 24.8 | 5.2 | 4.0 | 5 minutes | X | O | O |
| Example 4 | 61.2 | 8.8 | 24.8 | 5.2 | 6.0 | 5 minutes | X | O | O |
| Example 5 | 61.2 | 8.8 | 24.8 | 5.2 | 10.0 | 5 minutes | X | O | O |

Referring to Table 3, in the case of Examples 2 to 4 having a temperature increase rate of 3 to 10° C./s, hydrogen in a steel sheet could be released to the outside to secure not only strength but also delayed fracture properties. In contrast, in the case of Comparative Example 12 in which a temperature increase rate was as low as 2° C./s, no cracks occurred 0.4%, Mn: 0.5 to 3.0%, Si: 0.1 to 0.8%, B: 0.01% or less (excluding 0), Ti: 0.1% or less (excluding 0), and the remainder including Fe and other unavoidable impurities.

3. The plated steel sheet for hot press forming of claim 1, wherein an attachment amount of the plating layer attached to the surface of the base steel sheet is 40 to 120 g/m².

4. The plated steel sheet for hot press forming of claim 1, wherein the plating layer has a thickness of 5 to 40 μm.

5. The plated steel sheet for hot press forming of claim 1, wherein an Al—Fe-based interface alloy layer formed between the base steel sheet and the plating layer and including, by weight, Al: 30.0 to 60.0% and Si: 5.0 to 20.0%, is provided.

* * * * *